United States Patent [19]

Mita et al.

[11] Patent Number: 4,904,852
[45] Date of Patent: Feb. 27, 1990

[54] IC CARD READER

[75] Inventors: Katsuya Mita, Kyoto; Murieki Morishita, Takatsuki, both of Japan

[73] Assignee: Omron Tateisi Electronics Co., Kyoto, Japan

[21] Appl. No.: 287,667

[22] Filed: Dec. 21, 1988

Related U.S. Application Data

[63] Continuation of Ser. No. 130,288, Dec. 8, 1987, abandoned.

[30] Foreign Application Priority Data

Dec. 12, 1986 [JP] Japan .................................. 61-296423
Dec. 13, 1986 [JP] Japan .................................. 61-297333
Jun. 1, 1987 [JP] Japan .................................. 62-138746

[51] Int. Cl.⁴ .......................................... G06F 13/04
[52] U.S. Cl. .................................. 235/479; 235/435; 235/441; 235/443
[58] Field of Search ............... 235/438, 441, 443, 479

[56] References Cited

U.S. PATENT DOCUMENTS 3,916,156 10/1975 Pass et al. ..................... 235/443
4,236,667 12/1980 Crowley ...................... 235/379 X
4,404,464 9/1983 Moreno .

FOREIGN PATENT DOCUMENTS 0167356 1/1986 European Pat. Off. .
3235654A 3/1984 Fed. Rep. of Germany .
3235654 3/1984 Fed. Rep. of Germany .
3343727 6/1985 Fed. Rep. of Germany .
3343727A 6/1985 Fed. Rep. of Germany .
233560 of 0000 France .
2445560 7/1980 France .
2477303 9/1981 France .
2578072 8/1986 France .
55-5001383 3/1980 Japan .
2124420A 2/1984 United Kingdom .

OTHER PUBLICATIONS

European Search Report, The Hague, 12-21-88.

*Primary Examiner*—Harold I. Pitts
*Attorney, Agent, or Firm*—Stevens, Davis, Miller & Mosher

[57] ABSTRACT

A contact member supporting member is pivotably supported to a slide member which abuts on a part of an IC card to be inserted and is moved by the IC card. When the slide member moves, the supporting member also moves. The supporting member is swung in the direction of the IC card by fixed cams. Thus, contact members of the supporting member come into contact with contacts of the IC card. Since the contact member supporting member moves together with the IC card, the contact members do not slide on the surface of the IC card. Therefore, the abrasion of the contact members and the damage of the IC card which are caused by the slide friction between the contact members and the surface of the IC card, and the like can be prevented.

7 Claims, 7 Drawing Sheets

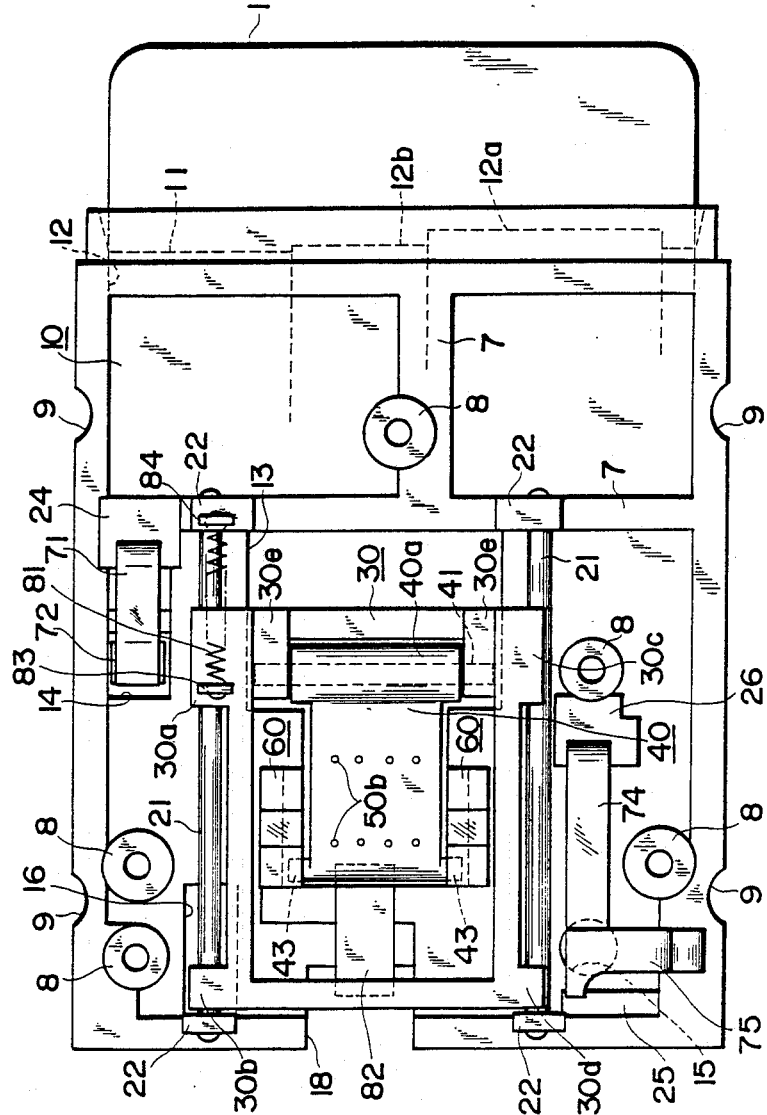

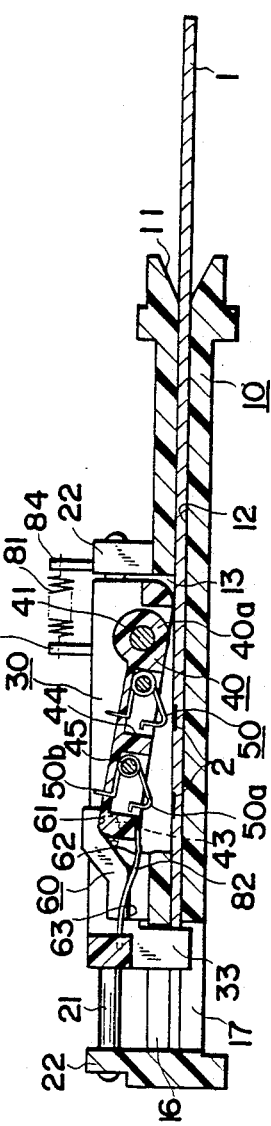
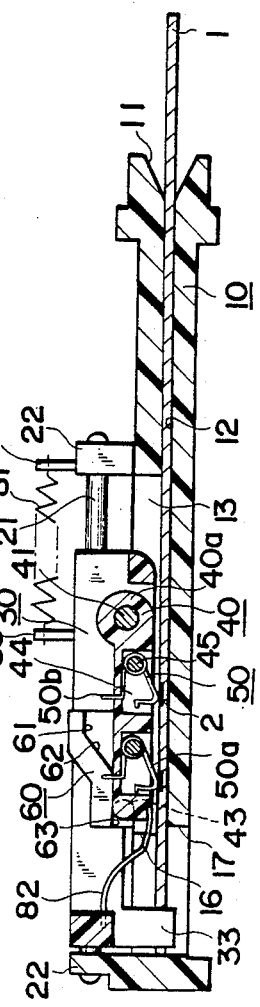

IC CARD READER

This application is a continuation, of application Ser. No. 130,288, filed Dec. 8, 1987, now abandoned.

BACKGROUND OF THE INVENTION

1. Technical Field

The present invention relates to an IC card reader having a plurality of contact members adapted to become into contact with a plurality of contacts of an IC (Integrated Circuit) card and for transmitting and receiving data to and from a circuit in the IC card. In general, most of IC cards include a CPU (Central Processing Unit) or MPU (Micro-processing Unit or Micro-processor) and a memory (and a battery, if necessary) in a card-shaped supporting medium. The IC card applicable to the IC card reader of the present invention also incorporates an IC card including only a CPU or MPU, an IC card including only a memory, an IC card including an electronic circuit other than the CPU or MPU, and the like.

2. Prior Art Statement

IC cards are being highlighted as excellent cards in place of magnetic cards and as useful cards adapted to new application uses which cannot be realized by the conventional magnetic cards or the like. The IC card has exposed contacts on the surface of the card. On the other hand, an IC card reader has contact members. When the IC card is inserted into the IC card reader, the contact members come into contact with the contacts of the IC card, and the electronic circuit in the IC card is electrically connected with the electronic circuit in the IC card reader, so that data, commands, control signals, and the like can be transmitted and received between both electronic circuits.

In the IC card reader, the contact members are generally positioned at the inner backward positions behind the passageway to insert or take out the IC card. When the IC card is inserted into this passageway, the contact members are projected or advanced into the passageway so as to cross it. However, according to the advancing/returning mechanism of the contact members of the conventional IC card reader, when the IC card is inserted in the way to the rear operative position, the contact members start coming into contact with the surface of the IC card. When the IC card is further inserted, the contact members relatively slide on the IC card surface in the direction opposite to the inserting direction. When the IC card has reached a predetermined position, the contact members touch the contacts of the IC card. When pulling out the IC card, the operations opposite to the foregoing operations are executed.

Since the contact members slide along the IC card surface when the IC card is inserted and pulled out, there is a problem such that the gilded portions of the contact members, in particular, are abraded by the slide and the life is short. Particularly, since the contact members are made of a spring material or pressed by springs in order to keep the sure electrical connection with the contacts of the IC card, the frictional force upon sliding is large and the abrasion is very large. Since the contacting pressures with the contacts of the IC card change due to the abrasion of the contact members, a defective contact easily occurs.

SUMMARY OF THE INVENTION

It is an object of the present invention to solve the problem which is caused when the contact members in an IC card reader rub the surface of an IC card. Namely, the invention intends to provide a mechanism in which the contact members directly come into contact with the contacts of the inserted IC card and the IC card is moved to a predetermined position in this state.

According to the invention, an IC card reader comprises: guide means which is provided for a frame of the IC card reader and guides an IC card so as to be smoothly inserted and ejected; a slide member supported to the frame so as to be movable in the inserting and ejecting directions of the IC card and having a receiving projecting portion to move the slide member in the inserting direction of the IC card in contact relation with a part of the inserted IC card; a contact member supporting means which has a plurality of contact members adapted to become into contact with a plurality of contacts of the IC card and which is pivotably supported to the slide member so as to be freely swung; first urging means for urging the slide member in the ejecting direction of the IC card; second urging means for urging the contact member supporting means in such a direction that the contact members are away from a passageway of the IC card; and a fixed cam fixed to the frame, in which when the slide member is moved in the inserting direction of the IC card through the receiving projecting portion by the IC card which is inserted, the fixed cam comes into contact with a part of the contact member supporting means that is moved in the IC card inserting direction and rotates the contact member supporting means against the urging force of the second urging means in such a direction that the contact members come into contact with the IC card.

In the IC card reader of the invention, the slide member abuts on the IC card which is being inserted and moves together with the IC card in engaged relation with the IC card through the receiving projecting portion. On the other hand, since the contact member supporting means having the contact members is pivotably supported to the slide member, the supporting means moves together with the slide member. Namely, according to the invention, the slide member and the contact member supporting means move together with the IC card which is being inserted. When the supporting means moves, the contact members of the supporting means advance in the direction of the IC card by the contact with the fixed cam. Therefore, by positioning the respective components such that the contact members just face the contacts of the IC card when the IC card has abutted on the receiving projecting portion of the slide member, the contact members directly come into contact with the contacts of the IC card and do not rub the surface of the IC card.

The above and other objects and features of the present invention will become apparent from the following detailed description and the appended claims with reference to the accompanying drawings.

BRIEF DESCRIPTION OF THE DRAWINGS

FIGS. 14 to 16 show another embodiment of the invention;

FIG. 14 is a plan view corresponding to FIG. 1; and

FIGS. 15 and 16 are cross sectional views corresponding to FIGS. 11 and 13.

DETAILED DESCRIPTION OF THE PREFERRED EMBODIMENTS

Figure 1:
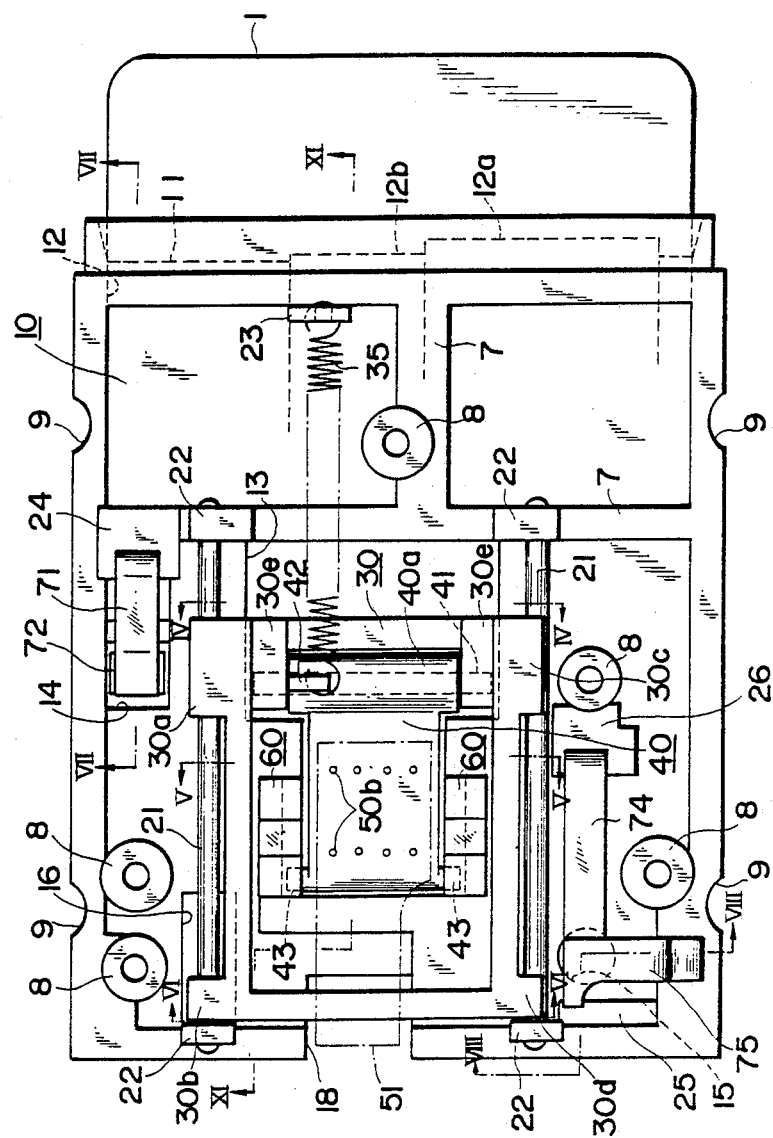
FIG. 1 is a plan view of a whole IC card reader in an embodiment of the invention and illustrates a state in which an IC card was inserted to a predetermined position.
Figure 2:
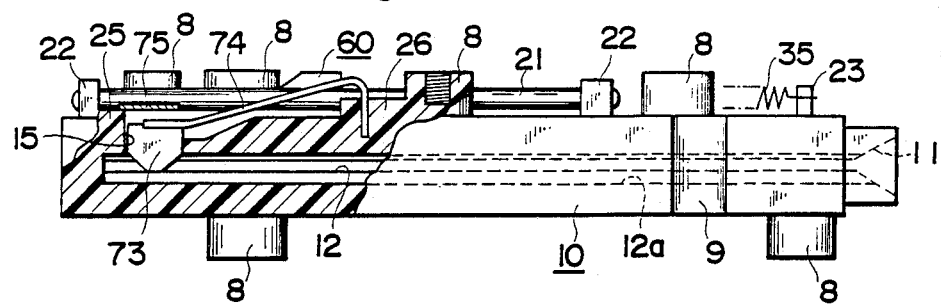
FIG. 2 is a side elevational view of the IC card reader and illustrates a state in which a slide member and a contact member supporting member are omitted.
Figure 3:
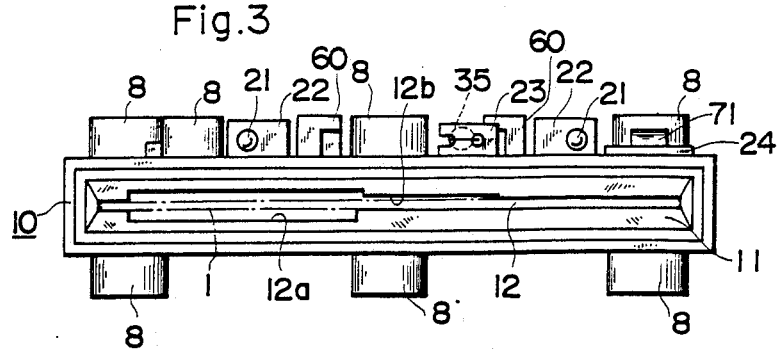
FIG. 3 is a front view of the IC card reader and shows a state in which the slide member and the contact member supporting member are omitted.
Figure 4:
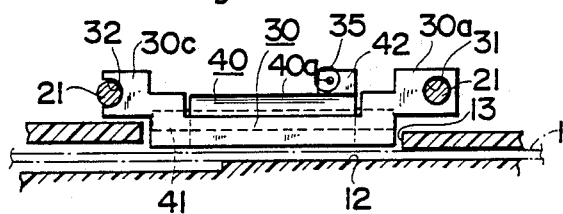
FIG. 4 is a cross sectional view taken along the line IV—IV in FIG. 1.
Figure 5:
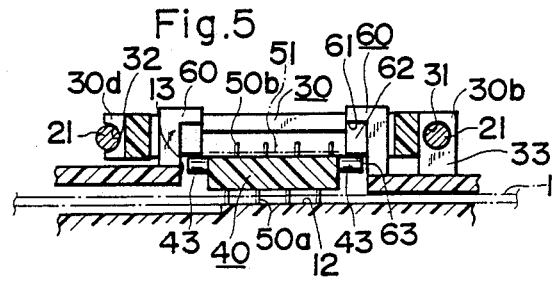
FIG. 5 is a cross sectional view taken along the line V—V in FIG. 1.
Figure 6:
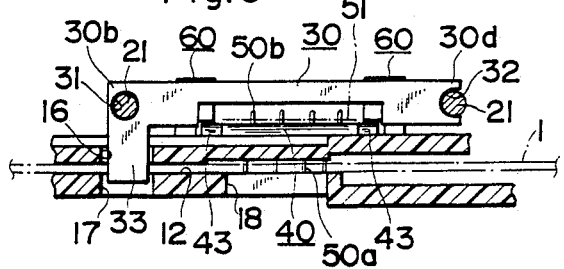
FIG. 6 is a cross sectional view taken along the line VI—VI in FIG. 1.

Referring now to FIGS. 1 to 3, a frame 10 of an IC card reader is formed like a flat box shape whose whole surface is almost covered excluding only an inserting port 11. The frame 10 is made of a synthetic resin. Practically speaking, the frame 10 consists of an upper half body and a lower half body. These two bodies are coupled by proper fixing or bonding means, thereby constituting an integrated frame 10. An IC card passageway 12 extending laterally from side to side of the frame 10 is formed in the frame 10 in the range from the inserting port 11 to the end portion. As clearly illustrated in FIG. 3, a space portion 12a having a height larger than a normal height of the gap, which corresponds to the thickness of the IC card 1, is formed in the passageway 12 in order to prevent the collision or scratch with the emboss formed on an IC card 1. Another space portion 12b having a height lower than the height of the portion 12a and larger than the normal height of the gap is also formed in the passageway 12 in order to likewise prevent the collision with a plurality of contacts 2 of the IC card 1 (in some of the IC cards, the contacts are slightly projected from the surface of the IC card). By forming the large space portions 12a and 12b in the passageway 12 in this manner, the IC card 1 can be smoothly inserted into the IC card reader without damaging the emboss and contacts of the IC card due to the collision with the inner surface of the passageway 12. The height of the other portions of the passageway 12 and the width of the whole passageway 12 are set so as to be substantially equal to thickness and width of the IC card 1, thereby guiding the IC card 1 so as to be smoothly inserted and ejected. The inserting port 11 has a tapered form which outwardly extends so that the IC card 1 can be easily inserted.

A plurality of bosses 8 to fix the frame 10 (i.e., the IC card reader) to the main body of an apparatus are formed at proper positions on both of the upper and lower plates of the frame 10 (in this case, the terms "upper" and "lower" are used when looking at FIGS. 2 and 3 as the reference diagrams). Screw holes are formed in the bosses 8. The frame 10 is fixed by use of screws. In addition, a plurality of arc-shaped concave portions 9 for positioning are formed on both side surfaces of the frame 10. On the other hand, openings or holes or notches 13 to 18 are formed in the upper and/or lower plates of the frame 10 and these will be explained in detail hereinlater. Reference numeral 7 denotes reinforcing ribs which are respectively formed on both upper and lower plates of the frame 10.

Referring now to FIGS. 4 to 6 and FIGS. 11 to 13 in addition to FIGS. 1 to 3, the opening 13 is formed in almost the central portion of the upper surface of the frame 10. Guide rods 21 are arranged in parallel at slightly upper positions on both sides of the opening 13. The guide rods 21 are respectively fixed at both ends by projecting shoe portions 22 formed integrally with the frame 10. The guide rods 21 extend in the inserting and ejecting directions of the IC card 1.

A slide member 30 is supported to the guide rods 21 so as to be movable in the longitudinal direction of the guide rods 21. The slide member 30 is formed like an almost rectangular frame when it is seen as a plan view. Bearing portions 30a, 30b, 30c and 30d are provided at four corners of the slide member 30, respectively. The slide member 30 is also made of a synthetic resin. Holes 31 are formed in the bearing portions 30a and 30b. One of the guide rods 21 is slidably disposed in the holes 31. Holes 32 which are partially cut away are formed in the bearing portions 30c and 30d. The other guide rod 21 is slidably disposed in the holes 32. Namely, the bearing portions 30c and 30d slidably embrace the other guide rod 21.

Assuming that the end of the frame 10 having the inserting port 11 is the front, a receiving projecting portion 33 downwardly extends from one of the bearing portions 30b on the rear side. The receiving projecting portion 33 passes through the opening 16 formed in the upper plate of the frame 10 and vertically traverses the passageway 12 and further extends into the hole 17 formed in the lower plate of the frame 10.

When the IC card 1 is inserted from the inserting port 11 into the passageway 12, the front edge abuts on the receiving projecting portion 33. By further inserting the IC card, the slide member 30 moves toward the backward portion of the frame 10 against the force of a return spring 35, which will be explained hereinlater. The guide of the slide member 30 is fundamentally accomplished by the bearing portions 30a and 30b on one side and by one of the guide rods 21 penetrating these bearing portions. Since the receiving projecting portion 33 arranged on the side of the bearing portions 30a and 30b, the slide member 30 is smoothly slided. The other bearing portions 30c and 30d loosely support the other guide rod 21 and assist the guide of the slide member 30 and also stabilize the position of the slide member 30. Even if the IC card 1 to be inserted is slightly inclined in the inserting direction, the slide member 30 comes into contact with the IC card at one point (namely, one receiving projecting portion 33), so that the inclination of the IC card 1 will not exert a bad influence on the slide member 30.

A contact member supporting member 40 is swingably supported to the slide member 30. Namely, a fulcrum portion 40a is provided in the front portion of the supporting member 40. An axis 41 penetrates the inside of the fulcrum portion 40a and is fixed. On the other hand, bearing portions 30e are formed in the inside portions of the bearing portions 30a and 30c of the slide member 30. The portions projecting to both sides of the axis 41 are rotatably supported by the bearing portions 30e. The supporting member 40 is also made of a synthetic resin.

A spring shoe 42 is integrally formed on the fulcrum portion 40a and extends toward the almost upper portion. On the other hand, a spring shoe 23 is also integrally formed in the front upper portion of the frame 10. The coil spring (tension spring) 35 is attached between the spring shoes 42 and 23. The spring 35 returns the slide member 30 to its standby position (idle position) and also returns the contact member supporting member 40 to its standby position.

Figure 9:
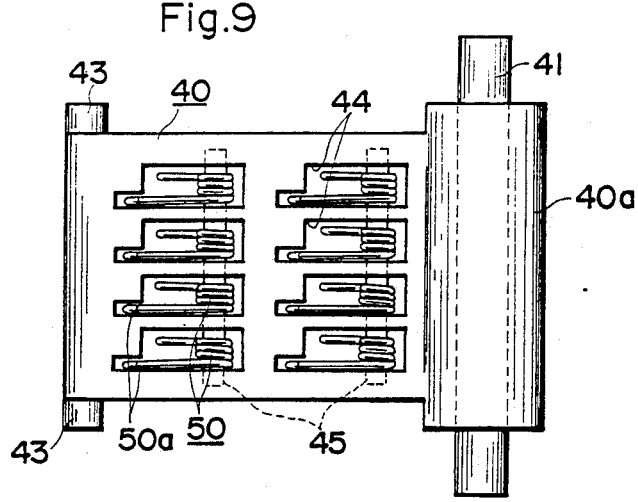
FIG. 9 is an enlarged diagram of the bottom surface of the contact member supporting member.

FIG. 9 enlargedly illustrates the bottom surface of the supporting member 40. In this embodiment, eight concave portions 44 are formed in the bottom surface of the supporting member 40. Contact members 50 are fitted into the concave portions 44. The axis 45 is fixed in the concave portions 44. Each contact member 50 is a kind of snap type spring. The coil portion of the contact member 50 is wound around the axis 45. One end of the coil portion downwardly extends to form a contact portion 50a and the other end penetrates the supporting member 40 and is projected over the upper surface, thereby forming a connecting portion 50b.

Figure 10:
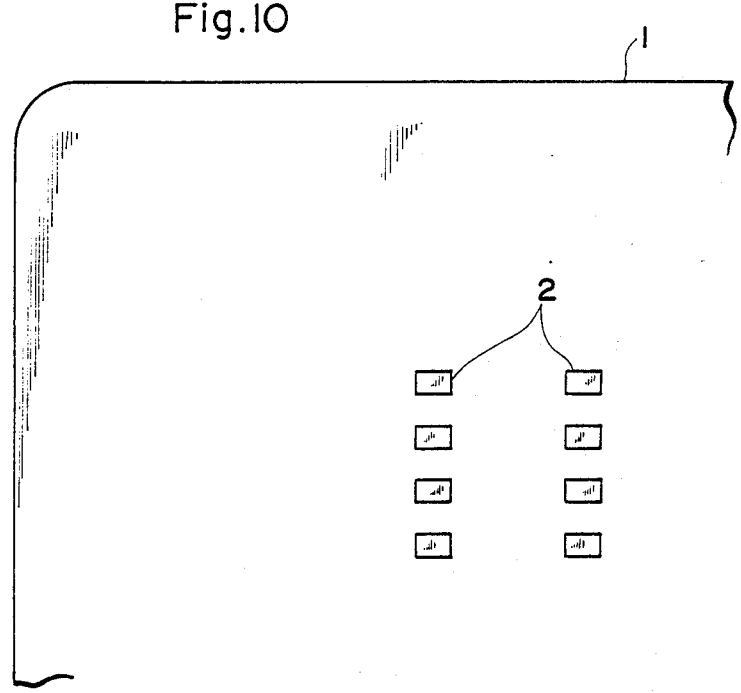
FIG. 10 is an enlarged diagram of a part of an IC card.

FIG. 10 enlargedly shows the portion where the contacts 2 of the IC card 1 are formed. In this embodiment, eight contacts 2 are formed on the IC card 1. Eight contact members 50 are provided for the supporting member 40 so as to have substantially the same arrangement with that of the eight contacts 2. The IC card reader is designed in a manner such that each contact member 50 is located just over each corresponding contact 2 of the IC card 1 when the IC card 1 is inserted into the passageway 12 of the IC card reader and its front edge just abuts on the receiving projecting portion 33.

The connecting portions 50b of the contact members 50 projecting over the supporting member 40 are respectively connected to a wiring pattern of a flexible printed circuit board 51 to be led to the outside. A part of the printed circuit board 51 is fixed onto the supporting member 40 and passes through the notch 18 formed in the rear portion of the frame 10 and is led to the lower surface of the frame 10 and connected to a printed circuit board (not shown) attached to the lower surface of the frame 10.

Projections 43 are formed on both sides of the front portion of the supporting member 40. On the other hand, fixed cams 60 are disposed at the positions on both sides of the opening 13. Each of the fixed cams 60 has an upper horizontal cam surface 61 in the direction from the front to the rear, an inclined cam surface 62 which is backwardly downwardly slanted, and a lower horizontal cam surface 63. The projections 43 of the supporting member 40 come into contact with these cam surfaces.

The projections 43 adapted to come into contact with the cam surfaces are not necessarily provided for the supporting member 40. It is also possible to constitute such that both side portions of the supporting member 40 come into contact with the cam surfaces.

Figure 7:
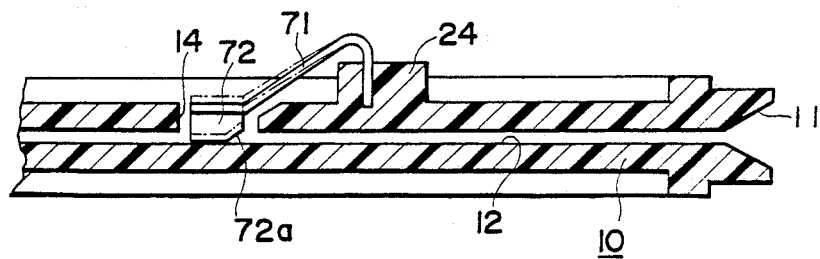
FIG. 7 is a cross sectional view taken along the line VII—VII in FIG. 1.

Referring now to FIGS. 1 and 7, the opening 14 is formed in one side portion of the upper plate of the frame 10. An IC card fixing member 72 is enclosed in the opening 14. The fixing member 72 is fixed to one end of a leaf spring 71. The other end of the leaf spring 71 is inserted and fixed into a projection 24 formed on the frame 10. The fixing member 72 is downwardly urged by the leaf spring 71, thereby pressing the lower surface of the passageway 12. When the IC card 1 is inserted into the passageway 12, the front edge of the IC card 1 abuts on a slant surface 72a of the fixing member 72, so that the fixing member 72 is pushed up against the depressing force of the leaf spring 71. Thus, the fixing member 72 downwardly presses the upper surface of the IC card 1, thereby fixing the IC card 1 by the depressing force.

Figure 8:
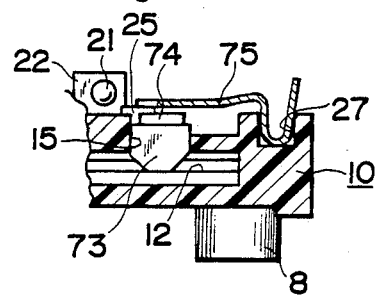
FIG. 8 is a cross sectional view taken along the line VIII—VIII in FIG. 1.

Referring to FIGS. 1, 2, and 8, the hole 15 is formed in the upper plate in the rear portion of the frame 10 and a fixing member 73 is fitted into the hole 15 so as to be freely vertically movable in a manner similar to the above. One end of a leaf spring 74 is inserted into a projection 26 formed on the frame 10. The fixing member 73 is attached to the other end of the leaf spring 74. The fixing member 73 is downwardly pressed by the leaf spring 74. The fixing members 72 and 73 are formed of a soft material or an elastic material so as to prevent the damage or scratch of the IC card.

One end of a contact member 75 made of a spring member is fixed by being pushed into a concave portion 27 of the frame 10. The other end of the contact member 75 extends over the fixing member 73. Although the contact member 75 is downwardly pressed, a part of the other end portion thereof abuts on a convex portion 25 formed on the frame 10, so that the height position of the other end portion is determined. When the IC card 1 is inserted and reaches the rear end portion in the passageway 12, the fixing member 73 is upwardly pushed by the amount of the thickness of the IC card 1. Then, a part of the other end portion of the leaf spring 74 comes into contact with a part of the other end portion of the contact member 75, so that the leaf spring 74 is electrically connected with the contact member 75. Namely, a sensor to detect the insertion of the IC card is constituted by the fixing member 73, leaf spring 74 and contact member 75.

The sensor to detect the insertion of the IC card or the state in which the IC card has been inserted to a predetermined position is not limited to the foregoing constitution. For example, it is also possible to use a photoelectric sensor whose optical path is shut off by the IC card, or the like.

The fixing members 72 and 73 are used to prevent that the IC card 1 inserted into the passageway 12 from being returned by the force of the return spring 35. However, the invention is not limited to these fixing means. For example, it is also possible to provide a locking device for locking the IC card inserted to a predetermined position so that the IC card cannot be pulled out.

The whole operation will now be described with reference to FIGS. 11 to 13.

Figure 11:
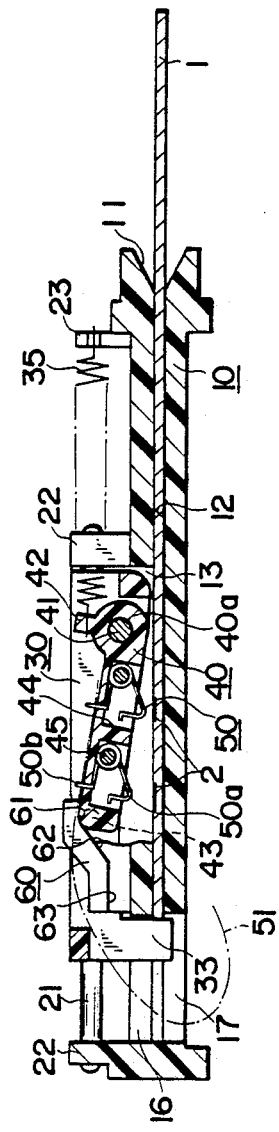
FIGS. 11 to 13 are cross sectional views taken along the line XI—XI in FIG. 1 which are illustrated in accordance with the order of the operations.

In FIG. 11, at the standby position, the slide member 30 is returned to the front position by the force of the return spring 35 and is held at such a position that the receiving projecting portion 33 abuts on the front edge of the opening 16 or the front portion of the slide member 30 abuts on the front edge of the shoe portion 22 or opening 13. The rear end portion of the contact member supporting member 40 is also upwardly lifted by the force of the spring 35 and the supporting member 40 is held at such a position that the projection 43 abuts on the upper horizontal cam surfaces 61 of the fixed cams 60.

When the front edge of the inserted IC card 1 abuts on the receiving projecting portion 33 and the IC card 1 is further inserted, the slide member 30 moves backward and the supporting member 40 also together moves in the same direction. As shown in FIG. 12, the projections 43 of the supporting member 40 move from the horizontal cam surfaces 61 and slide along the cam surfaces 62. Thus, the rear portion of the supporting member 40 descends and the supporting member 40 approaches the horizontal position. The contact portions 50a of the contact members 50 come into contact with the corresponding contacts 2 of the IC card 1, respectively.

Figure 13:
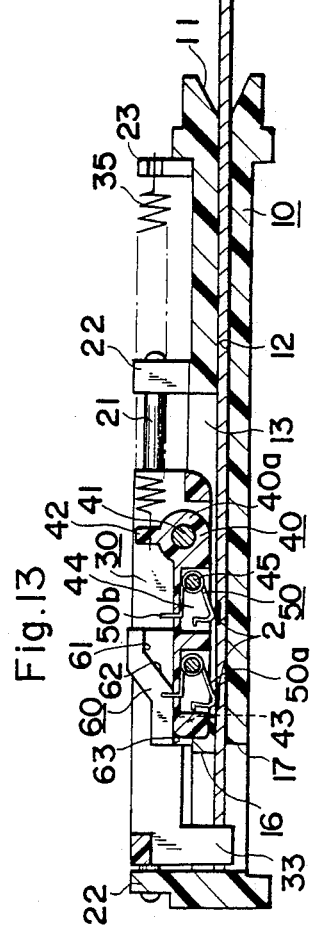

When the IC card 1 is further inserted in this state, as shown in FIG. 13, the projections 43 of the supporting member 40 move from the inclined cam surfaces 62 to the lower horizontal cam surfaces 63. The supporting member 40 is located in parallel with the IC card 1. The contact portions 50a strongly come into contact with the contacts 2, respectively. When the receiving projecting portion 33 abuts on the rear edge of the opening 16, the IC card 1 is completely inserted to a predetermined position.

As mentioned above, the fixing member 73 is pushed up by the inserted IC card 1 and the leaf spring 74 comes into contact with the contact member 75, so that the end of insertion of the IC card is detected. Since the IC card 1 is pressed by the pressing forces of the leaf springs 71 and 74 of the fixing members 72 and 73 and by the spring forces of the contact members 50, the IC card is fixed to the inserted position against the recovery force of the spring 35. Data is communicated between an electronic circuit in the IC card and an electronic circuit in the IC card reader by the electrical contacts between the contact members 50 and the contacts 2 in this state.

Figure 12:
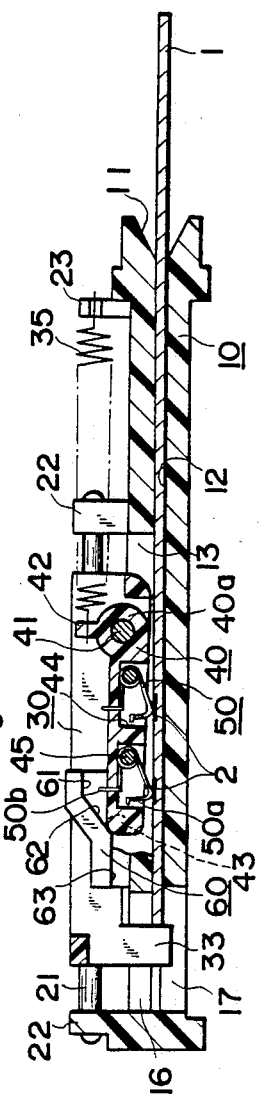

As will be understood from FIGS. 11 to 13, the contact members 50 of the supporting member 40 directly come into contact with the contacts 2 of the IC card 1 without sliding along the surface of the IC card 1. Even if the IC card 1 is further moved, the supporting member 40 is also moved together with the movement of the IC card 1. Therefore, the contact members 50 are set to the predetermined position of the IC card 1 while keeping the contact relation with the contacts 2 and there is no relating displacement.

When the IC card 1 is pulled out, the slide member 30 and supporting member 40 and the like perform the operations opposite to the foregoing case by the force of the return spring 35 and are returned to the standby positions. In this case as well, the contact members 50 do not slide along the surface of the IC card 1.

On the other hand, some of the IC cards have magnetic stripes on a part of the surface of each card. For example, the kind of IC card, ID code and the like are magnetically recorded on the magnetic stripe. In such an IC card, by arranging a magnetic head to the position where the magnetic stripe passes in association with the insertion of the IC card, data recorded on the magnetic stripe can be read or written.

In the foregoing embodiment, the slide member 30 and supporting member 40 are returned by a single spring 35. However, as shown in FIGS. 14 to 16, a return spring 81 of the slide member 30 and a return spring 82 of the supporting member 40 can be also individually attached. In these diagrams, the coil spring (tension spring) 81 is attached between a spring shoe 83 formed on the bearing portion 30a of the slide member 30 and a spring shoe 84 formed on the shoe portion 22 of the frame 10. The return spring 82 is the leaf spring. One end of the leaf spring 82 is fixed to the rear portion of the slide member 30 and the other end upwardly pushes the lower surface of the rear portion of the supporting member 40.

What is claimed is:

1. An IC card reader comprising:
   guide means, provided for a frame of the IC card reader, for guiding an IC card so as to be smoothly inserted and ejected;
   a slide member supported to said frame so as to be movable in the inserting and ejecting directions of said IC card and having a receiving projecting portion to move said slide member in the inserting direction of the IC card in contact relation with a part of the inserted IC card;
   a contact member supporting means having a plurality of contact members adapted to come into contact with a plurality of contacts of the IC card and pivotally supported to said slide member so as to be freely swung;
   first urging means for urging said slide member in the ejecting direction of the IC card;
   second urging means for urging said contact member supporting means in such a direction that said contact members are away from a passageway of the IC card;
   said first and second urging means being formed by a spring which is attached between said frame and said contact member supporting means; and
   a fixed cam fixed to said frame, in which when said slide member is moved in said inserting direction through said receiving projecting portion by the IC card being inserted, said fixed cam comes into contact with a part of said contact member supporting means that is moved in said inserting direction and rotates said contact member supporting means against the urging force of said second urging means in such a direction that said contact members come into contact with the IC card.

2. An IC card reader according to claim 1, further comprising an IC card fixing member which is pressed and supported by a spring fixed to said frame so as to be projected into the IC card passageway.

3. An IC card reader according to claim 1, further comprising a sensor to detect when the IC card is inserted to a predetermined position.

4. An IC card reader according to claim 1, further comprising supporting guide means for supporting said slide member so as to be freely movable in the inserting and ejecting directions of the IC card, wherein said supporting guide means consists of two guide rods fixed to the frame in parallel with each other at a constant distance away from each other, said slide member has at least two first portions having holes through which one of the guide rods slidably penetrates and at least two second portions adapted to slidably support the other guide rod, and said receiving projecting portion is disposed on the side of said first portions.

5. An IC card reader comprising:
   guide means for smoothly guiding an IC card into and from a passageway of said reader;
   a contact mechanism for bringing contact members into contact with contacts on a surface of an IC card inserted in said passageway when the IC card reaches a predetermined position;

a first spring member having one end portion urged toward the passageway by the spring elasticity, and a fixing member attached to said one end portion for depressing an IC card which is inserted to said predetermined position into said passageway; and a second spring member having one end portion arranged over the one end portion of the first spring member, the one end portions of the first and second spring members coming into contact with each other by elevating displacement of the one end portion of the first spring member upon the insertion of the IC card in said passageway to the predetermined position, said first spring member, fixing member and second spring member defining a sensor upon contact of the one end portions of said first and second spring members for detecting insertion of the IC card to said predetermined position and said first spring member and fixing member further providing a depressing force for holding said IC card in position.

6. An IC card reader according to claim 5, wherein said fixing member formed of a soft material or elastic material.

7. An IC card reader according to claim 5, wherein the one end portion of the second spring member is biassed toward said passageway and abuts on a convex portion of a frame which determines the height position of the one end portion of the second spring member.

* * * * *